United States Patent
Bertelrud et al.

(10) Patent No.: US 7,290,243 B1
(45) Date of Patent: Oct. 30, 2007

(54) METHOD AND APPARATUS FOR APPLICATION BUILDING USING BUILD STYLES

(75) Inventors: Anders Bertelrud, Los Gatos, CA (US); John Graziano, Redwood City, CA (US); Mike Ferris, Oakland, CA (US); Christian Molick, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 09/796,503

(22) Filed: Feb. 28, 2001

(51) Int. Cl.
*G06F 9/44* (2006.01)

(52) U.S. Cl. ...................... 717/107; 717/100

(58) Field of Classification Search ............. 717/140, 717/144, 120, 122, 166, 100–109, 136–150
See application file for complete search history.

(56) References Cited

U.S. PATENT DOCUMENTS

| | | | | |
|---|---|---|---|---|
| 4,809,170 A | * | 2/1989 | Leblang et al. | 717/122 |
| 5,237,691 A | * | 8/1993 | Robinson et al. | 717/107 |
| 5,247,683 A | * | 9/1993 | Holmes et al. | 709/221 |
| 5,493,682 A | * | 2/1996 | Tyra et al. | 717/122 |
| 5,613,117 A | * | 3/1997 | Davidson et al. | 717/144 |
| 5,754,858 A | * | 5/1998 | Broman et al. | 717/111 |
| 5,774,728 A | * | 6/1998 | Breslau et al. | 717/141 |
| 5,850,554 A | * | 12/1998 | Carver | 717/162 |
| 5,966,538 A | * | 10/1999 | Granston et al. | 717/158 |
| 5,970,252 A | * | 10/1999 | Buxton et al. | 717/166 |
| 6,298,476 B1 | * | 10/2001 | Misheski et al. | 717/101 |
| 6,370,681 B1 | * | 4/2002 | Dellarocas et al. | 717/110 |
| 6,487,713 B1 | * | 11/2002 | Cohen et al. | 717/105 |
| 6,490,719 B1 | * | 12/2002 | Thomas | 717/107 |
| 6,742,175 B1 | * | 5/2004 | Brassard | 717/107 |
| 6,769,115 B1 | * | 7/2004 | Oldman | 717/126 |
| 2002/0133812 A1 | * | 9/2002 | Little et al. | 717/140 |

OTHER PUBLICATIONS

ObjectMake Guide, 1996, Continuus Software Corporation, pp. 18-21.*
DuBois, Paul, Software Portability with imake, Nov. 1996, O'Reilly & Associates, Inc, pp. 5-11.*

* cited by examiner

*Primary Examiner*—Meng-Al T. An
*Assistant Examiner*—Trenton J. Roche
(74) *Attorney, Agent, or Firm*—Adeli Law Group PLC

(57) ABSTRACT

What is disclosed is a method of building a software product in an integrated development environment using several build styles and a target. The method includes (1) determining an order of precedence for the build styles, where each of the build styles comprises a dictionary of build settings; and (2) building a software product by applying at least one of several build styles to the target based upon the order of precedence. In various embodiments of the invention, the build settings within the build styles are capable of referring to other build settings and concatenating new values with previously defined values.

15 Claims, 7 Drawing Sheets

METHOD AND APPARATUS FOR APPLICATION BUILDING USING BUILD STYLES

BACKGROUND

1. Field of the Invention

The present invention relates to compilers and software development tools. More specifically, the present invention relates to the building of applications and the construction of software code.

2. Description of Related Art

The typical means of building an application or executable from source code involved a series of separate stages such as compiling, linking, and building. However, more recently, these stages have been placed under the control of a single user application that makes the process more user friendly. Such applications provide IDEs (Integrated Development Environments) that allow for building of application or framework products based on plans or roadmaps known as "targets". Given a particular source code or file, targets that are nearly identical but have a few different settings may be conveniently generated using an IDE. For instance, when building a final version of an application from a set of source code, it may be useful to also produce a debuggable version of the application from the same source. In this case, there would be two targets: one for the final version that would be distributed for use, and another that the application designers and testers would use to attain debugging information. Other targets may define a plan to build a version of the same application that has been optimized for a particular platform.

Settings (also referred to as parameters) for the construction of such targets, such as the directory path where source files may be located, are specified through the IDE. Typically, each target had to have its settings defined separately. More recent IDEs allow that where a second target shares some settings with a first target, the first target may be 'cloned' such that the second target does not have settings repetitiously defined by the user. In this way, settings such as the directory path can be copied from one target to another. However, in order to track changes to build settings through the various targets, targets must be redefined and perhaps recloned, or changes must be independently made to each target. This is because, after cloning, the targets are independent of one another. Such problems often occur because of the differences often inherent in building applications for development versus deployment cycles. There is thus a need for simplifying the process of changing, defining, and/or redefining the settings for targets.

SUMMARY OF THE INVENTION

A method of building a software product in an integrated development environment by using several build styles and a target. The method includes (1) determining an order of precedence for the build styles where each of the build styles comprises a dictionary of build settings; and (2) building a software product by applying at least one of several build styles to the target based upon the order of precedence. The build settings within the build styles are capable of referring to other build settings and concatenating new values with previously defined values.

DETAILED DESCRIPTION OF THE INVENTION

The invention in various embodiments utilizes dynamic, precedence-based build styles in integrated development environments for the purpose of building software products. Each of the build styles define a number of settings that can be dynamically applied to any target at the time at which the target is constructed. Because build styles are applied to the targets dynamically at the time when a build starts, changes to settings in the build styles are automatically reflected during the builds of the targets, without requiring modifications to the targets themselves.

The invention features the ability to apply multiple build styles to the same target. The build settings within the build styles are capable of referring to other build settings and concatenating new values with previously defined values. The integrated development environment thus contains algorithms for expanding and finalizing build settings as well as for determining the order of precedence for the various build styles applied. Advantageously, a single target is capable of building more than one software product by merely applying different build styles.

Figure 1:
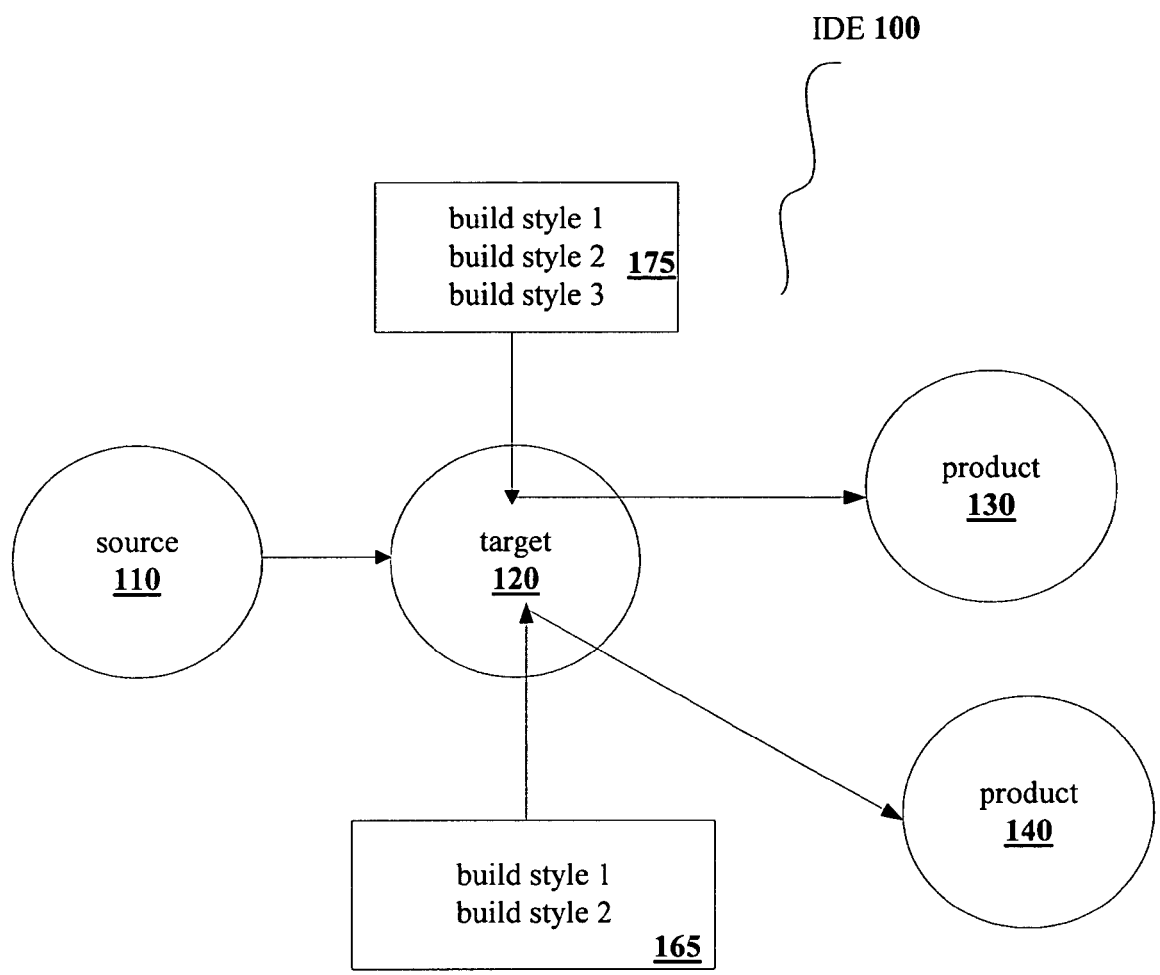
FIG. 1 illustrates the concept of build styles utilized in creating multiple software products in an IDE according to at least one embodiment of the invention.

FIG. 1 illustrates the concept of build styles utilized in creating multiple software products in an IDE according to at least one embodiment of the invention. The Integrated Development Environment (IDE) 100 has as one function the creating or "building" of software products such as executables. The IDE 100 takes a source 110, which may consist of source files, libraries, code segments, input data and other material, and uses a target 120, which specifies how the source is to be handled, to build products. In accordance with various embodiments of the invention, varying levels of build styles can be applied to the same target 120 to build separate products 130 and 140.

The environment 100 of FIG. 1 has two different build style "catalogs" 165 and 175 that specify a number of build styles to be applied in each case. Each of the build styles, such as build style 1, build style 2 and build style 3, have a number of build settings that can be applied in the creation (building) of a software product. Build style catalog 165 specifies the use of two build styles, build style 1 and build style 2, while build style catalog 175 specifies the use of three build styles, build style 1, build style 2 and build style 3. The applying of build style catalog 165 to a generic target 120 builds a first software product 140. The applying of build style catalog 175 to the same generic target 120 builds a second software product 130.

In accordance with one embodiment of the invention, the building of software products involves passing settings from the build styles to compilers, linkers and other mechanisms within the IDE. When building commences, an order of precedence is determined upon which the various settings can be finalized. Each setting consists of a pair of identifiers (a "key" and a "value"), with the precedence ensuring that the proper value is associated with a given key when settings are passed to the appropriate IDE building mechanism (compiler etc.).

For instance, in the building of software product 140, the process utilized by the invention would determine that the order of precedence is, starting from highest to lowest, build style 2, then build style 1, and then the target. Thus, when building actually commences, any action requiring the use of a particular build setting would search for the key-value pair that comprises that setting in build style 2. If the key-value pair corresponding to the setting is found (and is deterministic, see below) in build style 2, then any other identical keys contained in build style 1 and the target itself would be superseded due to the order of precedence. If the key-value pair is not found, then the search would proceed to build style 1, and then finally to the target itself. This process would repeat for every setting required until the product is complete.

The use of such build styles allows changes to be made to settings dynamically, without requiring modifications to the targets and build styles that have already been defined. For instance, if a setting or group of settings needs to be different, a new build style can be applied over the existing ones. Build style catalog 175 applies, for instance, a build style 3, that supersedes build style 2, build style 1, and the target, which all have decreasing order of precedence, correspondingly. The only difference between build style catalog 165, which results in the building of product 140, and build style catalog 175, which results in the building of product 130, is the addition of build style 3. Unlike the conventional method of actually defining a separate target for the creation of another software product, the same target 120 can still be used by merely applying another build style. This greatly improves maintainability, since the user can avoid having to clone several copies of the same target in order to build slightly different products. The target 120 may contain a series of generic settings common to all software products being generated from source 110, which can then be modified, appended to, etc. by the application of various build styles. Instead of placing settings directly into targets, build styles provide for a way to effectuate the same result without any synchronization problem between targets. Thus, changes to a setting in a given build style need only be made once. All software products that rely on that build style will instantly and concurrently reflect these changes when future builds are commenced. The order of precedence may be determined by the user or by the IDE.

The single target 120 is a blueprint of how to put source 110 together (e.g. the order of including files or the language interpreters or other mechanisms to use) which is generic to both products 130 and 140. For instance, debugging and release products may have many of the same generic build settings but the debug product may require a setting indicating to display error codes during runtime. In such a case, the two products could use the same target but stack a superseding build style in one catalog that specifies that the displaying of error codes during runtime to be enabled.

Figure 2:
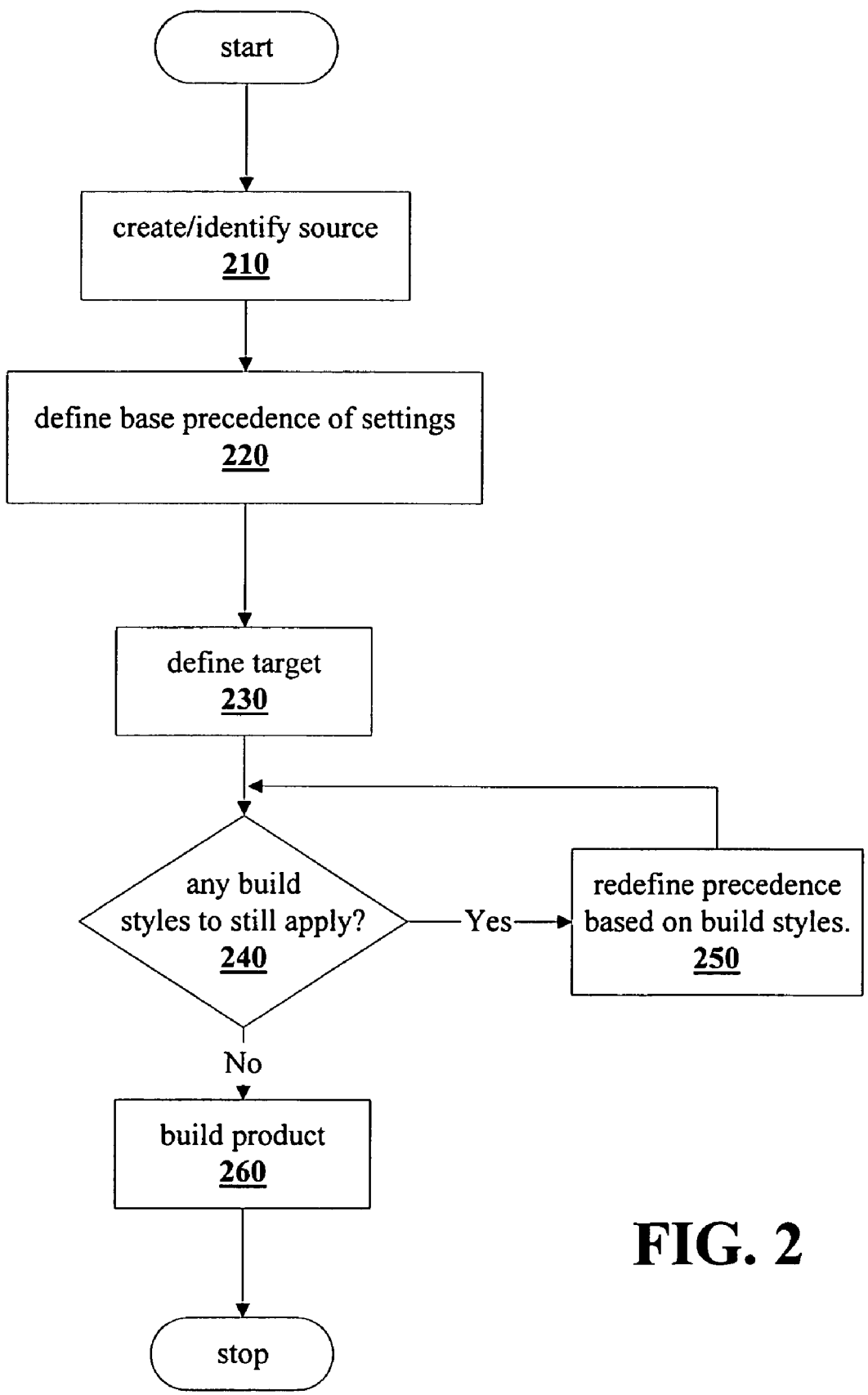
FIG. 2 illustrates the determining of an order of precedence for build settings according to at least one embodiment of the invention.

FIG. 2 illustrates the determining of an order of precedence for build settings according to at least one embodiment of the invention. First, the source (e.g. source files, libraries, stored procedures etc.) is created and/or identified (block 210). The identification of the source may itself be the subject of one or more build settings which are contained in build styles and/or the target(s). Before the final order of precedence for finalizing build settings can be determined, a base order of precedence is defined (block 220). The base order would include settings originating external to the IDE (e.g. environment variables of the operating system or shell), as well as settings which are static (e.g. platform-specific settings). Next, the target is defined (block 230). The base order of precedence would also include the very highest precedence, which is assigned to command-line settings (see FIG. 4). The target is a blueprint for how to put the product together. As such, it may include settings that are likely to be common to all versions (builds) of the product, such as the location of source files. In accordance with the invention, any such settings can be over-ridden by applying build styles to supersede the generic target settings. The target's own settings are also included in the base order of precedence.

Figure 4:
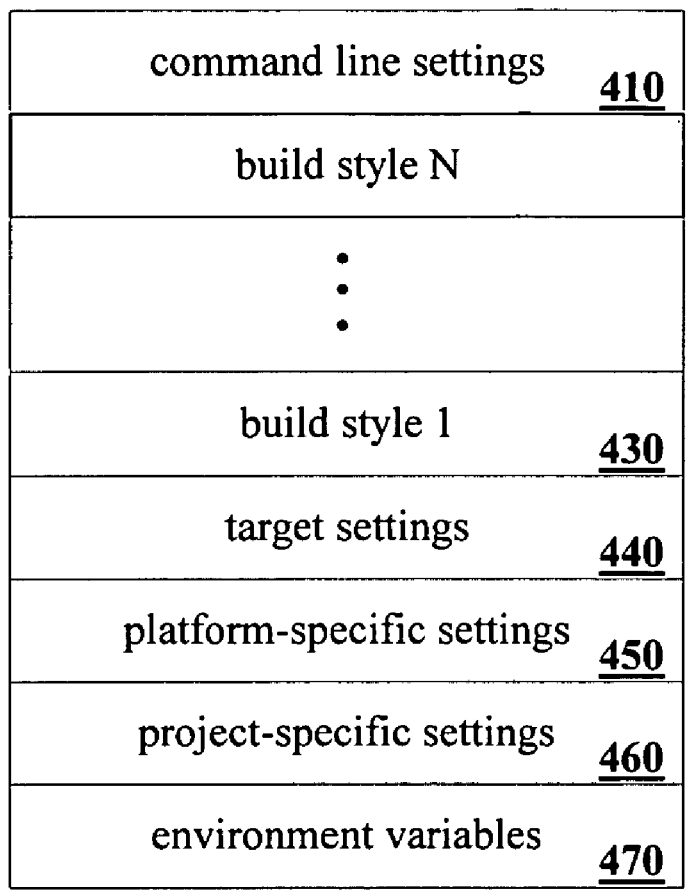
FIG. 4 illustrates an exemplary order of precedence stack according to at least one embodiment of the invention.

In one embodiment, the base order of precedence can be modified by build styles, if any, before building of the product commences. Thus, at block 240, the process checks to see whether there are any build styles that need to be applied. If so, the order of precedence is redefined based on those build styles (block 250). The build style catalog may be read to see what precedence each build style holds, i.e. which build style was applied first, which second and so on. This ordering may be temporal or user-defined (an example is shown in FIG. 4).

When there are no more build styles to apply (checked at block 250), then the order of precedence is completely determined. Next, the actual process of building the product can commence (block 260). Building the product involves a number of actions, such as compiling and linking, which are beyond the scope of this description. However, when performing these and other build actions, the IDE must at times look up settings that can be applied thereto, and it is this aspect to which the features of the invention are directed rather than to the actions themselves. The determining of settings for various actions is defined in large part by the order of precedence that is established, which may include one or more build styles.

Figure 3:
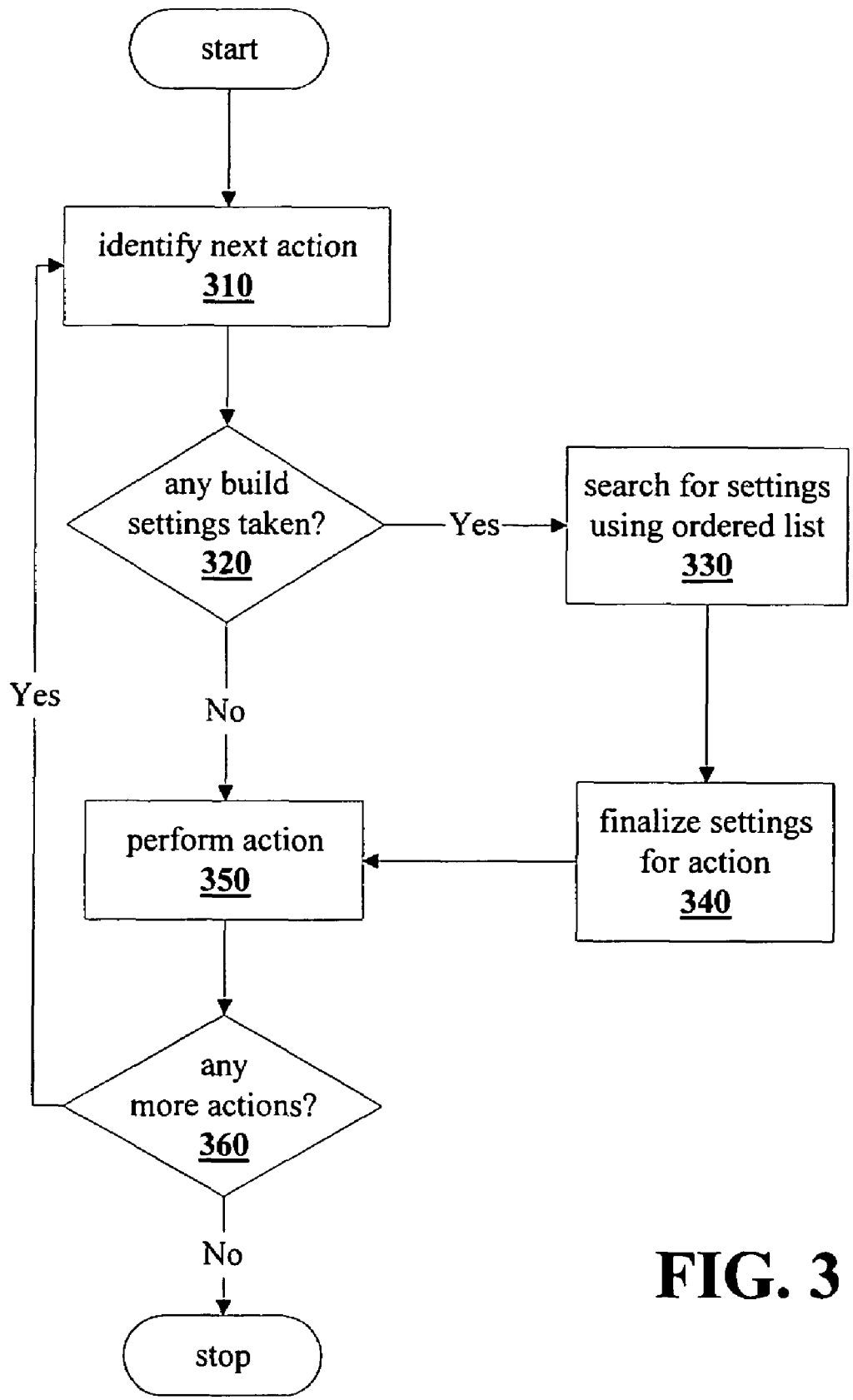
FIG. 3 illustrates the process of building a software product according to at least one embodiment of the invention.

FIG. 3 illustrates the process of building a software product according to at least one embodiment of the invention. The building of a software product in an IDE is often an amalgam of a set of actions, such as compiling and linking, which are performed in a particular sequence. In this sequence, each succeeding action needs to be identified (block 310). Some actions may require build settings, while other actions may not take settings at all. The IDE will thus check whether the action takes or requires any settings (block 320). If the action does not take any settings at all, then according to block 350, the action is performed without a settings search.

If the action does take settings (checked at block 320), then, according to block 330, a search for those settings is undertaken using the order of precedence that has been established. The order of precedence indicates where and in what fashion settings are to be searched for. As described below, the search for settings may require parsing, expression evaluating, finding references and so on, and in so doing, will follow the order of precedence that has been established. After the search for settings has been performed, the settings can be finalized (block 340). The finalizing of settings includes ensuring that a deterministic value is discovered for each looked-up key (the key-value pair comprising a setting). Once the settings are finalized for the given action, the IDE commences performing of that action (block 350).

Figure 5A:
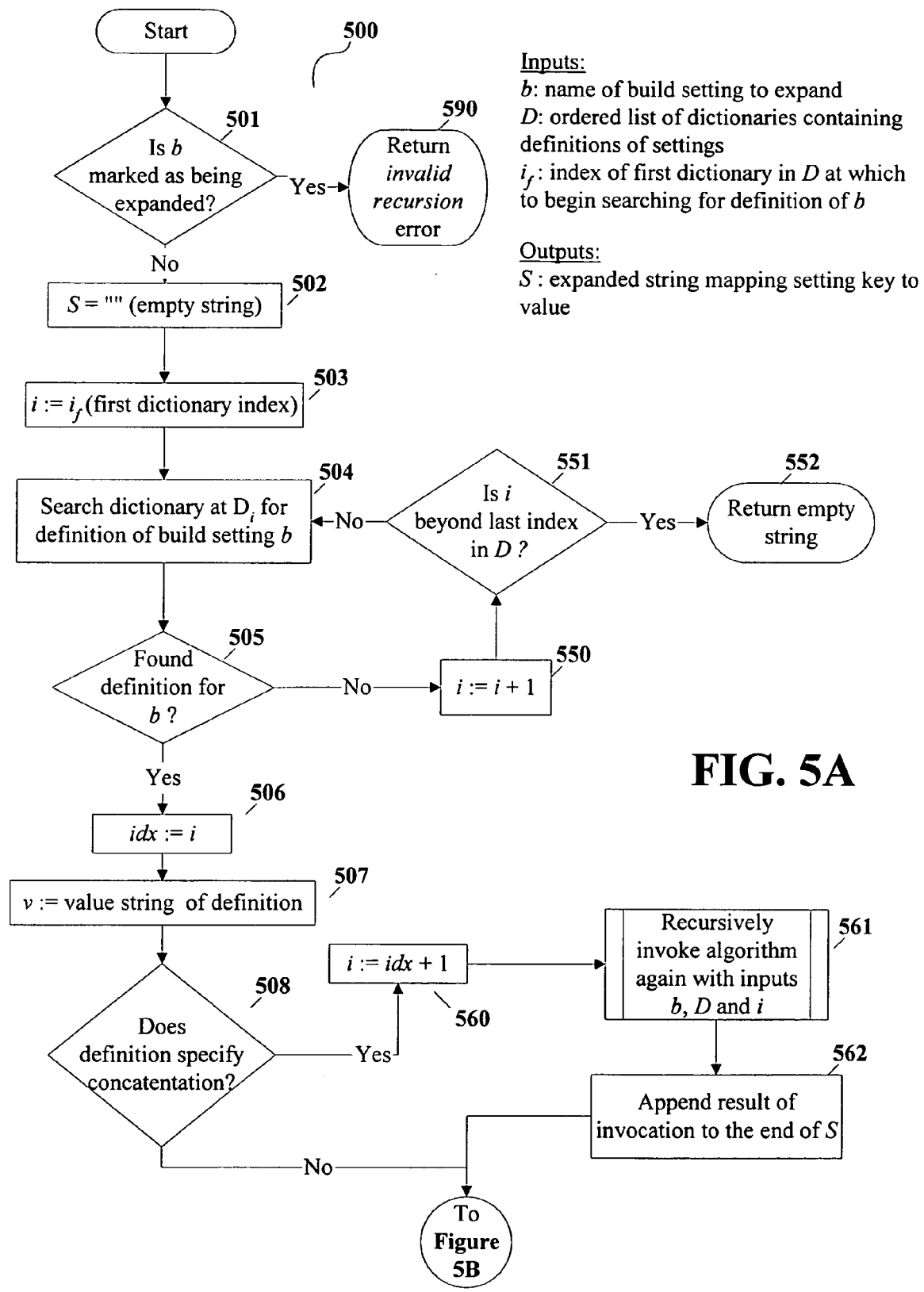
FIGS. 5A and 5B illustrate the expansion of a particular build setting according to at least one embodiment of the invention.
Figure 5B:
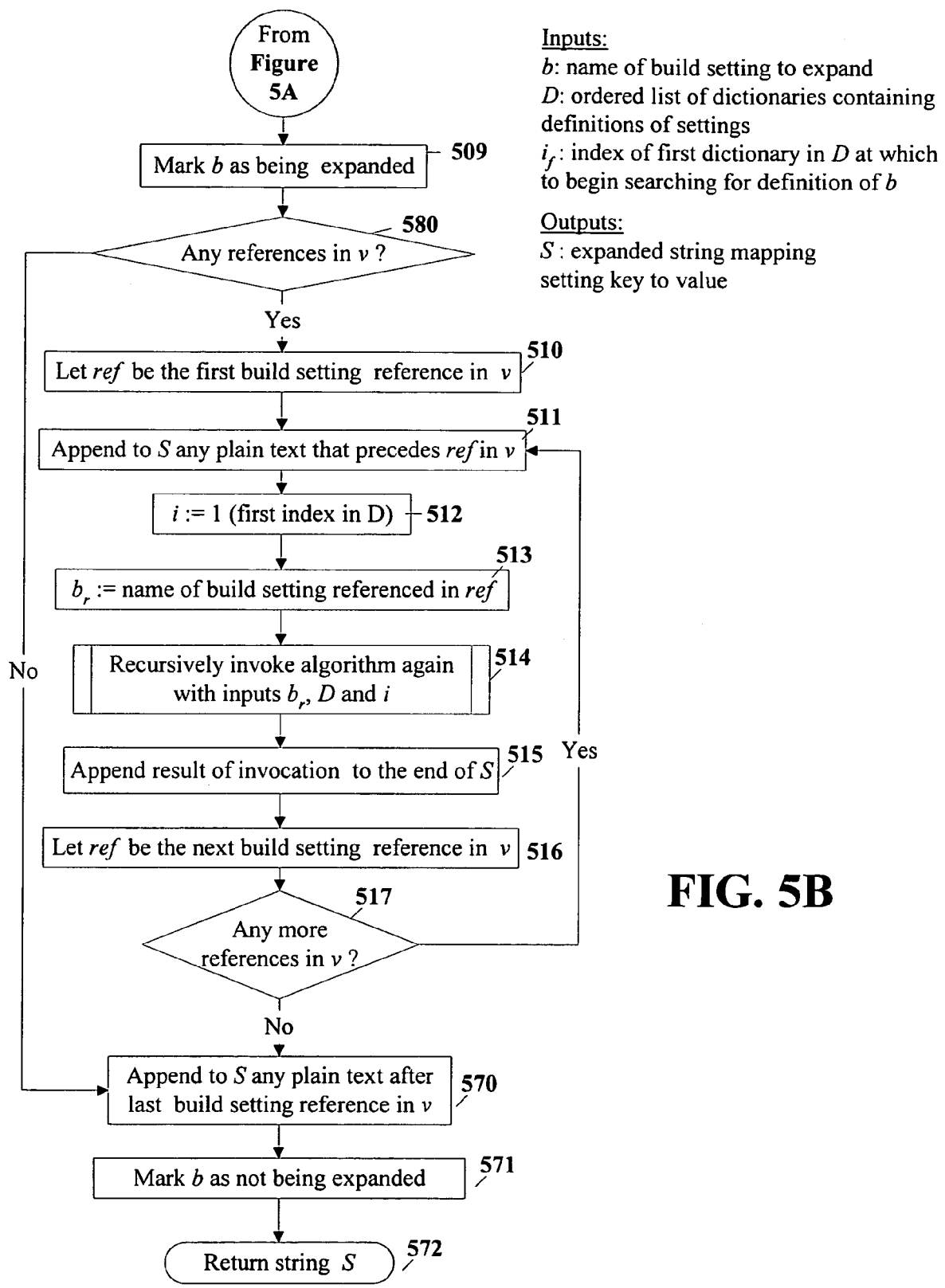

This process of identifying the action to be performed (block 310), determining whether settings are taken (block 320), searching for settings (block 330), finalizing settings (block 340) and performing the identified action (block 350) are repeated for every action in the build process. Thus, according to block 360, the IDE checks after/during the performance of a given action whether any more actions need to be performed. If so, the next action is identified (block 310), and blocks 320-360 repeat. If there are no more actions to perform, then the product build is completed. The search for settings is based upon the order of precedence of settings dictionaries that has been previously established. The finalizing of settings occurs in part as described with respect to FIGS. 5A and 5B.

FIG. 4 illustrates an exemplary order of precedence dictionary list according to at least one embodiment of the invention. The order of precedence list 400 defines the order in which settings dictionaries (such as build styles, groups of settings etc.) will be searched when the process of finalizing settings occurs for an action in the IDE. Ordinarily, a final override of any setting is made possible at the command line level. As a result, any setting prescribed on the command line always overrides internal settings. Thus, command line settings 410 will ordinarily be given the highest precedence when performing a settings search. In the searching algorithm, if command line settings 410 are not dispositive for a particular setting, then the search continues with the next dictionary in the order of precedence list. The next dictionary is a build style N 420. As mentioned above, one or more build styles may be applied in the definition of a product build. Each build style is a collection (dictionary) of key-value pairs. In at least one embodiment of the invention, each key is a string and each value is string that can contain literal characters and/or expandable references to other settings. Each key-value pair also contains an operator that specifies whether the value should replace or be appended to the existing value during expansion.

Build style N is shown as superseding all other build styles. The search for a particular setting starts at command line settings 410, then proceeds to build style N 420, and then proceeds until the last build style is reached. In list 400, the last build style shown is build style 1 430. There may also be other intervening build styles (shown by ellipsis) and in any order defined by the user. Further, while list 400 shows build style N 420 as having a higher precedence than build style 1 40, this ordering is merely exemplary. Depending on the order in which the user chose to apply the build styles, this ordering could be different from the one shown here. Further, the presence of build style N 420 and build style 1 430 does not necessarily indicate that a total of N build styles have been applied. Which build styles are applied, and in which order, can be defined by the user. However, once the product build is commenced, the applying of build styles is considered finalized (at least for that version of the product). As described below with respect to FIGS. 5A and 5B, the build style ordering in list 400 plays a prominent role in the algorithm for finalizing a given build setting.

The next settings dictionary in order of precedence is the dictionary that contains target settings 440. The target itself may have a dictionary of generic settings. These are over-ridden by the command lines settings 410 and the various build style settings (420 and 430). Whatever settings contained in the target, build styles that are all of higher order will supersede them. This enables a single target to be used in creating multiple products. Any settings not previously defined (in higher order dictionaries) are extracted from the target settings 440.

The next dictionary in the list 400 is project-specific settings 450. This is followed by platform-specific settings 460 and finally, environment variables 470. All of these can be over-ridden by target settings 440, or build style settings 420 and 430, or command-line settings 410. Project-specific settings are common to the project that contains the targets that the IDE is building, such as the name of the project. Platform-specific settings 460 are settings that may indicate the type of processor, type of operating system etc. that relate to the computer system or environment in which the eventual product would be executed. Environment variables 470 include settings such the system date/time, the login of the user, and so on.

In alternate embodiments of the invention build styles can have the property of inheritance, such that use of one build style automatically implies use of another. In other words, if build style A inherits from build style B, then mentioning A at precedence level i implies use of build style B at precedence level i+1.

Features and Operations of Build Style Build Settings

Build settings, whether found in build styles or in other dictionaries, take the form "key operator mapping" (referred to collectively as a "definition"). The key refers to the name of the build setting, for instance, "source path" could be the key for the setting specifying the path of source files. Operators include direct mapping, indicated by "=", and concatenation (see below), indicated by "+=". The mapping itself may be combination of literal strings (plain text) as well as references (see below) to other settings. The finalization of a setting indicates that its mapping has been resolved and certainly determined. Build settings within build styles have a number of advantageous features unavailable and difficult to reproduce in a consistent manner in typical settings libraries. The settings of build styles, in accordance with various embodiments of the invention, have the following capabilities which make settings quite dynamic and programmable. These include:

1) concatenation: a build setting definition may include a concatenation operation, whereupon the mapped string or its expansion is appended to the mapping that would have been in effect if the concatenation definition had not existed. Concatenation takes the form "key+=mapping", where the value of mapping is appended to the value that would have been assigned to key if the concatenation definition had not existed.

2) referencing: a build setting definition may include a reference to another build setting by referencing its key. If key1 and key2 refer to two build settings, then a referential mapping may take the form "key1=$key2" where $ is a sign of a reference to the value to which the setting key2 is mapped.

The expansion (finalization) of a mapping depends upon the number, type and order of references and concatenations. The expansion of a particular build setting is summarized in an algorithm 500 in FIGS. 5A and 5B.

Algorithm 500 has a series of three inputs—b, D an $i_f$. The input b is the name (key) of the build setting to expand, the input D is the list of dictionaries in their order of precedence, and the input $i_f$ is the index for the first dictionary in the list D at which the search for the definition of b is conducted. The ordered list D is the result of establishing an order of precedence of dictionaries and may resemble the list 400 shown in FIG. 4. The output of algorithm 500 is a string S and represents the finalized deterministic value for the key being defined. The string S, when finalized, will contain no further references nor concatenation.

Algorithm 500 begins by checking whether the input build setting b is already marked as being expanded (block 501). The default and initial flag indicates that b is not being expanded. Block 501 essentially checks to see if a build setting recurses upon itself. For instance, a key called "key1" cannot refer to itself as part of its mapping. Hence, the definition "key1=$key1" would be invalid, since trying to expand such a definition would lead to infinite recursion. Thus, if b is ever marked as being itself expanded (i.e. recursed into) then an invalid recursion error is returned (block 590).

If there is no invalid recursion error, the string S is initialized to " " or the empty string (block 502). A tracking variable i is set to $i_f$ (block 503), which is the input index into the array of dictionaries D where the search for the setting definition is to begin. On the first pass through algorithm 500, this value may be "1" or something similar, indicating to start with the dictionary that has the highest order of precedence in the list. A definition for setting b is searched for in the dictionary at $D_i$ (block 504) by comparing it to the names of the keys in that dictionary.

If a definition for setting b is not found within the dictionary at $D_i$ (checked at block 505), then the next dictionary is searched. To do so, the variable i is incremented by 1 (block 550). Next, the range of i is checked to see if it is currently beyond the last index in D (block 551). If it is not, then the search continues back at block 504. If i is beyond the last index of D, the empty sting is returned since no definition was found (block 552). Block 552 terminates the algorithm 500 in that particular invocation.

If a definition for setting b is found within the dictionary at any $D_i$ (checked at block 505), then the found index is stored. Another variable idx is utilized to store the value of i at which the definition was found (block 506). Then, the value string of the definition (i.e. the mapping string) is stored as v (block 507). The definition is checked to determine whether a concatenation operation is specified by the definition (block 508).

If concatenation is specified, then the mapping needs to be expanded beyond where the definition was originally found. Concatenation implies that the setting can have a mapping that is in a dictionary at a lower order of precedence. Therefore, the variable i is set equal to the found index (idx) incremented by one (block 560). Using this i and the dictionary list D as input, the algorithm 500 is recursively invoked to discover and resolve the lower ordered dictionary definition of the setting b (block 561). The lower ordered definition must first be resolved so that it can be concatenated with the original definition that invoked. There may be many such levels of concatenation and in each case, the lower ordered definitions are first resolved. After the algorithm 500 is invoked and completed, returning as output a result string, this result string is appended to the end of string S, the final output string (block 562).

If the definition specifies concatenation (checked at block 508), the blocks 560-562 are executed, but in either case, control thereafter flows to block 509. Block 509 marks the setting b as currently being expanded, in order to be able to detect an invalid recursion error in later stages of the algorithm. After checking for and performing concatenation operations, algorithm 500 proceeds to locate and then expand any references in the definition (blocks 510 through 517). Though the condition is not depicted in FIGS. 5A and 5B, if there are no references at all in the definition, blocks 510 through 517 are ignored.

If there are one or more references in the definition (checked at block 580), then the first stage in the expansion stores in a variable called ref the first build setting reference in v (the value string portion of the definition) (block 510). If there is any plain text preceding reference ref in v, this plain text is appended to the output string S (block 511). The setting referred to by the reference ref may occur in any dictionary in the list, and thus, the variable i is set equal to one, which is the first index in the list D (block 512). This indicates that the search should start again with the dictionary of highest precedence. A temporary variable $b_r$ is assigned the name of the build setting referred to by the reference ref (block 513). In order to expand the reference, the algorithm 500 is again recursively invoked with inputs of $b_r$, D, and i (block 514).

The result of the invocation is appended to the end of the output string S (block 515). The variable ref is assigned to the next build setting reference, if any, in the original mapped string v (block 516). The process of expanding build setting references (blocks 511 through 516) repeats as long as there are still references in v that need to be expanded (checked at block 517). When there are no references remaining to be expanded, then the string S is appended to with any plain text after the last build setting reference in v (block 570). If there were no references at all in v (checked at block 580), then the appending block 570 defaults to returning the entire plain text as the output string S.

Next, to prevent a invalid recursion error from occurring (in case the particular instance of algorithm 500 originated recursively), the input build setting b is marked as not being expanded (block 571). At the termination of algorithm 500 (and all invocations), the output is a result string S which is the fully expanded value to which the key (name of build setting) is mapped. In this resulting string contains, all setting references have been expanded based on the values to which those settings are mapped, as defined by the dictionaries. The result string is returned to the point of invocation during any recursive invocations of the algorithm.

Figure 6:
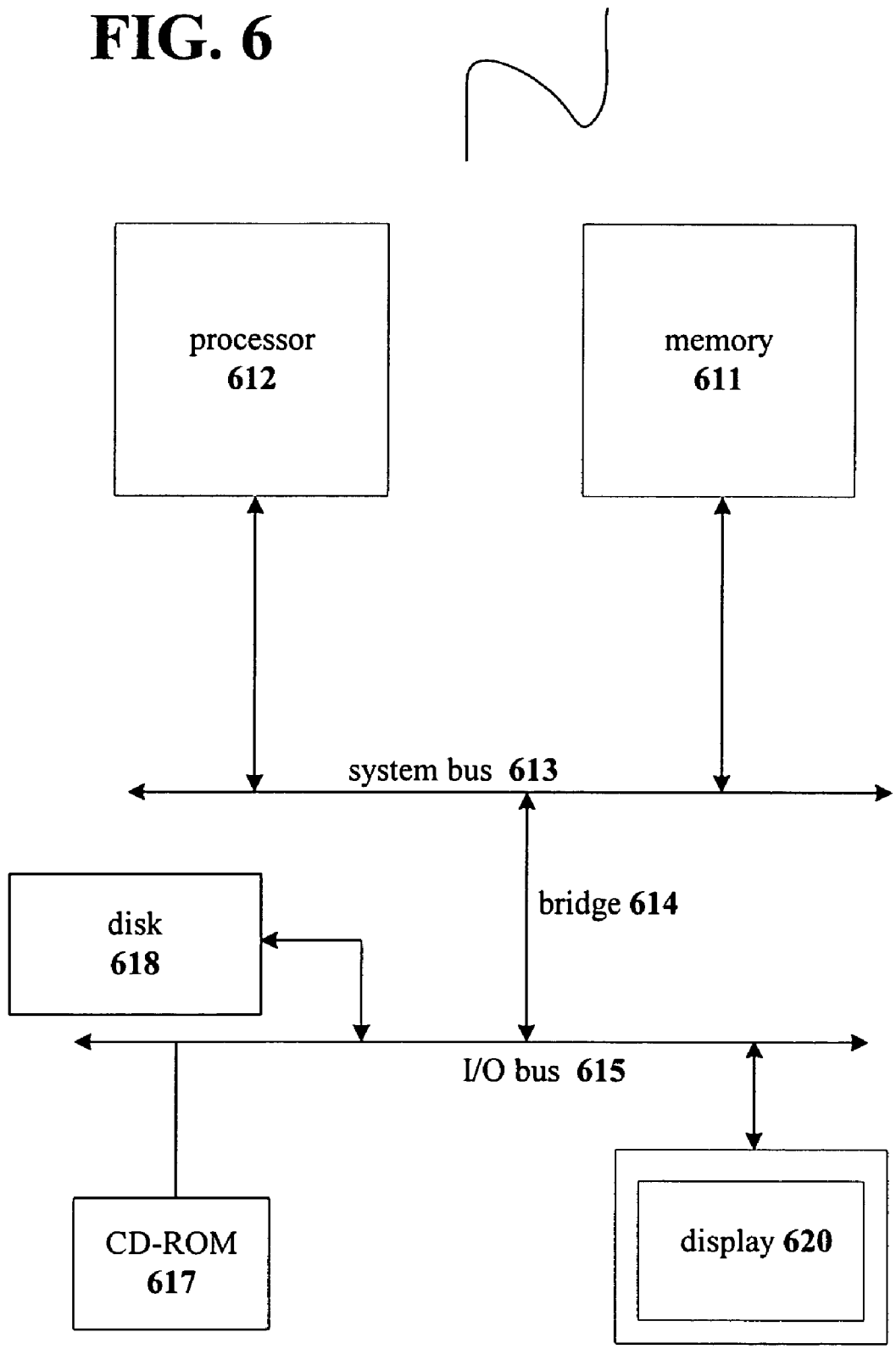
FIG. 6 shows an exemplary computer system capable of implementing various embodiments of the invention.

FIG. 6 shows an exemplary computer system capable of implementing various embodiments of the invention. A computer system 600 may be any of a mobile computer, desktop computer or any general or special purpose information processing device. System 600 features a system bus 613 for allowing core internal components, such as a processor 612 and a memory 611, to communicate with each other. Memory 611 may consist of random access memory (RAM), in any of its varieties or any other temporary or volatile storage mechanism. Memory 611 operates to store instructions to be executed by processor 612. Memory 611 also may be used for storing temporary variables or other intermediate result data during execution of instructions by processor 612. Computer system 600 also has a bridge 614 which couples to an I/O (Input/Output) bus 615. I/O bus 615 connects to system 600 various peripheral and I/O devices such as a disk 618, a display 620 and a CD-ROM drive 617.

Computer system 600 has an operating system (O/S) software (not depicted) that handles the interaction between its devices and software applications. Such O/S software would be layered underneath the IDE (Integrated Development Environment) which would run within it. Operating system software also governs the manner/mechanism of input/output for users of client 600. Due to its criticality, operating system software is most often permanently stored on disk 618, firmware or other semi-permanent storage. The operating system software typically runs in memory 611 after being loaded upon the start-up of computer system 600. In accordance with the invention, the IDE application, which also runs in memory 611, includes the feature of build styles, which can be dynamically and subjectively applied by a user using the input/output mechanisms of system 600.

Build styles could be stored onto disk 618 and accessed as needed. The order of precedence of the build styles can be largely user-determined. For instance, if a user applies a build style 2 and then applies a build style 1, build style 1 can be given a higher order of precedence than build style 2. In addition, the ordering of build styles could be modified by the user after they are applied, placing, for example, build style 2 can be assigned a higher order of precedence than build style 1 even though build style was applied last in time. Further, the computer system 600 can assist in the creation of new build styles and in the downloading/retrieval of previously created build styles.

The build styles, their features, functions and operation, as described in various embodiments of the invention, can be included as part of IDE software executing on processor 612 when loaded into memory 611. Such application programs or code to implement the ordering of build styles, the expansion of build settings through referencing and concatenation, can be written by those of skill in the art in a source language such as C++ and may be compiled and stored as executable(s) on disk 618. As part of an application program, such code may be pre-compiled and stored on a disc loaded by CD-ROM 617 and then loaded into memory 611 or installed onto disk 618. Software code that implements build styles and the algorithms for searching for and expanding build settings may be integrated with the IDE application.

A typical project flow, in accordance with various embodiments of the invention, would involve creating source material such as raw source code, written in C++ for example, then creating a target in the IDE, and then applying build styles to create an executable software product. Based on the version or features of the software product to be created, different build styles can be applied in whatever suitable order, to the same target. Each "catalog" of build styles then defines the complete framework for how the product(s) are to be generated. When creation of each product is commenced, the IDE then uses the build styles catalog, and develops an order of precedence for the search of build settings. As the various phases of building occur (i.e. compiling, linking etc.), then for any of these and other actions that take/require build settings, a search for and finalization of build settings is performed, using algorithms such as algorithm 500 (see FIGS. 5A and 5B) for each setting. Once all actions have been completed, the end result, barring error, is a software product built in conformity with the settings specified by the build styles in its corresponding catalog. New build styles may be created at any time by the user, and may, in some embodiments, have the capability of inheriting from other build styles.

What is claimed is:

1. A method of building a software product by using a plurality of build styles and a target for building a plurality of software products, the method comprising:
   to build a particular software product from the plurality of software products, defining an order of precedence for said build styles, wherein each of said build styles comprises a dictionary of build settings and wherein said order of precedence determines which build style will provide a value of a particular build setting for said particular software product when two build styles have conflicting values for said particular build setting; and
   building the particular software product by applying at least one of a plurality of build styles to said target based upon said order of precedence;
   wherein building the software product includes:
   identifying actions to be performed;
   searching for a definition of each build setting, said search beginning with dictionaries having a highest order of precedence proceeding in order with dictionaries having a lower order of precedence, said definition comprising a key, an operator and a mapping for said key, said key indicating the name of the build setting, said mapping indicating the value of the build setting;
   expanding the mapping of the key for said each build setting;
   assigning said expanded mapping to said key, said assignment finalizing said setting; and
   performing said actions in accordance with said finalized settings.

2. A method according to claim 1 further comprising:
   identifying of a source from which to build said software product; and
   defining of said target, said target characterized generically such that multiple software products can be built from the same said source.

3. A method according to claim 1 wherein said determining an order of precedence includes:
   defining a base order of precedence of other dictionaries containing build settings; and
   redefining said base order based upon the number, type and ordering of build styles.

4. A method according to claim 1 further comprising: defining of said build styles by a user prior to said applying.

5. A method according to claim 1 further comprising: retrieving of said build styles prior to said applying.

6. A method according to claim 1 wherein searching includes:
   designating the dictionary with the highest order of precedence as the starting dictionary;
   searching through said starting dictionary for said definition; and
   if a definition is not found in said starting dictionary, then repeating said searching through each dictionary of a lower consecutive order of precedence than said starting dictionary until said definition is found.

7. A method according to claim 6 wherein said expanding includes:
   initializing an output string to an empty string;
   parsing the found definition for the mapping (value) string;
   if the operation contained in the definition specifies concatenation, then performing an expansion of said mapping string, and appending the result therefrom to said output string;
   if there are any references in said mapping string, then performing an expansion of each of said references and appending the result therefrom to said output string; and
   appending any plain text occurring after said references, if any, and otherwise occurring in the mapping string, to the output string.

8. A method according to claim 7 wherein said expansion of said mapping string due to concatenation includes:
   designating as said starting dictionary, the dictionary with an order of precedence directly lower than the dictionary in which said definition specifying concatenation was found;
   recursively invoking said searching for a definition and said expanding; and
   appending the result of the recursive invocation to the end of said output string.

9. A method according to claim 7 wherein said expansion of each of said references includes:
- storing the reference;
- designating as a build setting to be searched for, a build setting named in said reference;
- designating as said starting dictionary, the dictionary with the highest order of precedence;
- recursively invoking said searching for a definition and said expanding; and
- appending the result of the recursive invocation to the end of said output string.

10. A method according to claim 8 wherein expansion is terminated if any references name the build setting currently being expanded as the build setting in the reference.

11. A method according to claim 7 wherein the finalizing is terminated and the empty string is returned as said output string if all dictionaries have been searched without any definition being found for said build setting.

12. A method according to claim 4 wherein said defining of build styles includes specifying inheritance from other build styles.

13. A method of building a software product by using a plurality of build styles and a target for building a plurality of software products, the method comprising:
- to build a particular software product from the plurality of software products, defining an order of precedence for said build styles, wherein each of said build styles comprises a dictionary of build settings;
- searching said build styles according to said order of precedence to identify a definition for a particular build setting, wherein said search identifies said definition from the build style that has the highest order of precedence from a set of build styles that each has a definition for the particular build setting, said definition comprising a key, an operator and a mapping for said key, said key indicating the name of the build setting, said mapping indicating the value of the build setting; and
- applying the definition of the particular build setting to the target.

14. The method of claim 13, wherein said applying comprises replacing a value of an existing build setting in said target with a value of said particular build setting.

15. The method of claim 13, wherein said applying comprises adding said particular build setting to a set of build settings in said target.

* * * * *